United States Patent
Stewart et al.

(10) Patent No.: US 6,262,684 B1
(45) Date of Patent: Jul. 17, 2001

(54) STYLUS ANTENNA

(75) Inventors: Kurt Stewart, Lehi; Sy Prestwich, Riverton; Jeffrey L. Jones, Orem; Steven Lo Forte, Midvale, all of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/604,713

(22) Filed: Jun. 27, 2000

(51) Int. Cl.$^7$ ........................................ H01Q 1/24
(52) U.S. Cl. ................. 343/702; 343/900; 345/179; 178/18.04; 178/19.01
(58) Field of Search .................... 343/702, 850, 343/852, 888, 889, 900, 901; 345/179, 180, 181; 178/18.01, 18.03, 18.04, 19.01, 19.04; H01Q 1/24

(56) References Cited

U.S. PATENT DOCUMENTS

| | | |
|---|---|---|
| 5,627,348 | 5/1997 | Berkson et al. . |
| 5,635,682 | 6/1997 | Cherdak et al. . |
| 5,889,512 | 3/1999 | Moller et al. . |
| 5,959,260 * | 9/1999 | Hoghooghi et al. .............. 178/18.03 |
| 5,973,677 * | 10/1999 | Gibbons ................. 345/179 |
| 6,104,350 * | 8/2000 | Ng et al. ............................ 343/702 |

* cited by examiner

*Primary Examiner*—Tho G Phan
(74) *Attorney, Agent, or Firm*—Workman, Nydegger & Seeley

(57) ABSTRACT

The present invention discloses antenna structures for portable digital devices that continuously receive radio signals in both the extended and the retracted antenna positions. In addition, the disclosed antenna structures tune the antenna based on the position of the antenna to achieve good impedance matching, which is particularly useful in reducing the noise and interference, while maximizing the available power for radiation from the portable digital devices. More specifically, a multiple position stylus antenna is disclosed that incorporates an antenna into a stylus for use with a Personal Digital Assistant (PDA). The stylus antenna uses one radiating element tuned for optimal performance in the extended position and synthesizes a compensation impedance to match the impedance of the feeding transmission line in the retracted position.

22 Claims, 5 Drawing Sheets

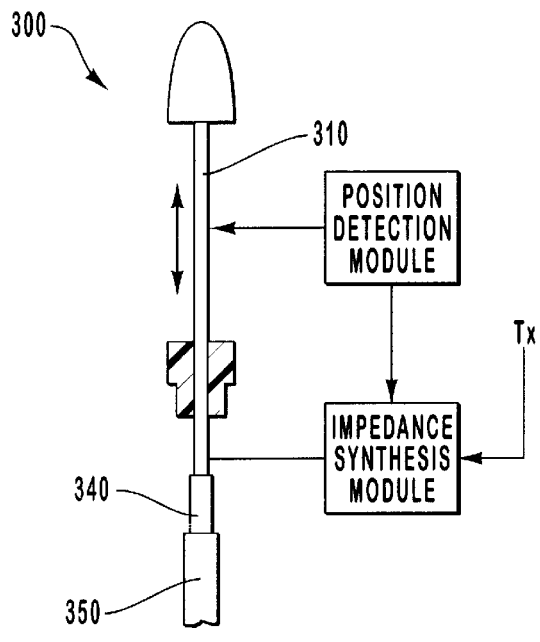
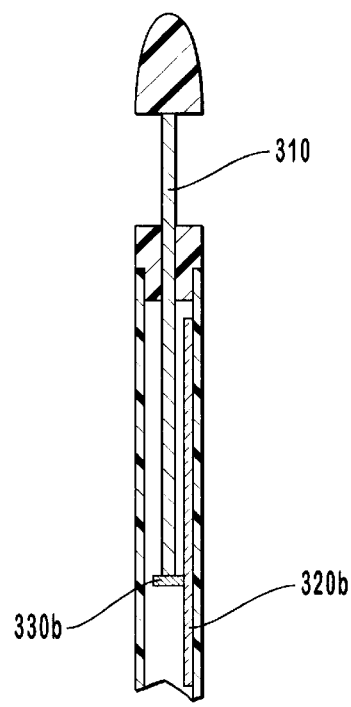
FIG. 4a
FIG. 4b
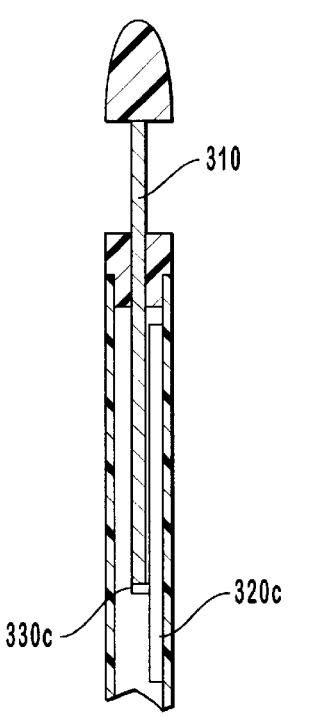
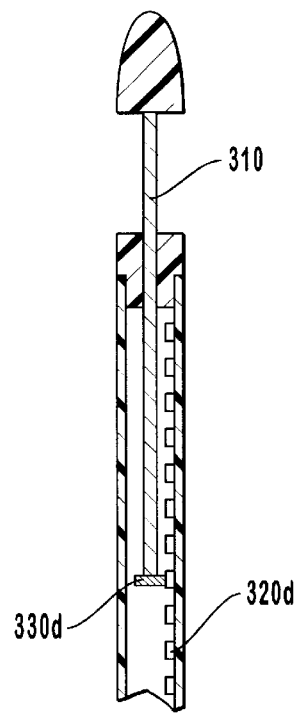
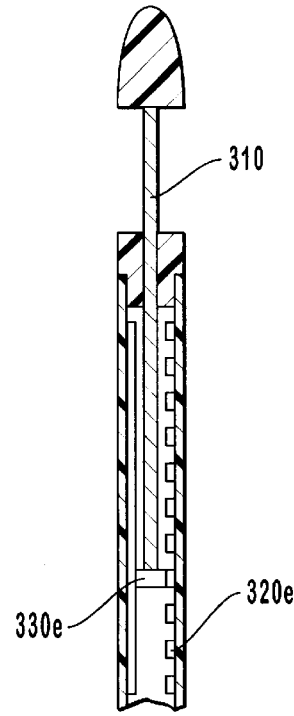
FIG. 4c
FIG. 4d
FIG. 4e

STYLUS ANTENNA

BACKGROUND OF THE INVENTION

1. The Field of the Invention

The present invention relates generally to antenna structures coupled to digital devices. More specifically, the present invention applies to an antenna with a retracted position and an extended position, where the digital device continuously receives RF signals regardless of the antenna position.

2. The Prior State of the Art

Antenna structures, predominantly used for wireless communication, efficiently transmit and receive electromagnetic energy in the form of radio waves. Antenna structures are used whenever it is impractical, or impossible to use a physical connection, such as a transmission line or waveguide. In order to get the best performance out of the wireless antenna, the antenna must not be obstructed by anything within its path of radiation. Conventional antennas used to connect a digital device to a wireless communication system or cellular telephone are typically placed externally from the digital device because of the noise, interference, obstruction and shielding caused by the various components of the digital device. In particular, conventional antennas do not function correctly if they are obstructed or shielded by the housing or other structures of the digital device.

Conventional antennas are also generally rigid and they protrude a relatively long distance from the body of the digital device. These protruding antennas are often large, unwieldy, aesthetically unpleasing and they make the digital device difficult to move and transport. In addition, these antennas are often bent, broken, knocked out of alignment or otherwise damaged because they can easily catch or strike foreign objects such as people, walls, doors, etc. Further, these known antennas require a large support structure to secure the antenna to the housing of the digital device and this support structure requires a considerable amount of space inside the body of the digital device. This space is very valuable, especially in small, portable digital devices. Additionally, the support structure is often damaged when the antenna is accidentally moved.

It is known that the repair and replacement of conventional antennas and the associated support structure is difficult and costly. In fact, the entire antenna assembly is often removed and replaced instead of attempting to repair a portion of the antenna or support structure. Thus, the repair and replacement of the antenna and/or antenna support structure is expensive and time consuming.

In order to alleviate these problems, many known antennas are often removed before the digital device is moved or transported. Other known antennas implement a retraction system where the antenna can be retracted into the antenna support structure when not in use. Additionally, known antennas must often either be retracted or removed before the digital device can be inserted into its carrying case. Disadvantageously, this requires additional time and resources to either retract and extend or remove and reattach the antenna each time the digital device is moved. Additionally, the removable antenna is often misplaced, lost or damaged when it is detached from the digital device. Further, because the user often does not want to take the time and effort to remove or forgets to retract the antenna, the digital device is moved with the antenna still extended and attached to the digital device and this frequently results in the antenna being damaged or broken.

In certain wireless applications, the user model requires that some connectivity be maintained at all times. In the case of a retractable antenna, the performance of the antenna may degrade when it is in the retracted position. As discussed previously, small digital or electronic devices such as PDAs, PCMCIA cards, laptop computers, and other wireless enabled digital devices employ an extendable antenna that can be optionally retracted into their respective packages. In this retracted position, the antenna will perform very poorly, if the antenna performs at all, due to the physical and environmental changes of the antenna introduced by the retracted position in, on, or around the antenna structure.

Traditionally, antenna design attempts to achieve good impedance matching to the feeding transmission line so as to maximize the available power for radiation. Unfortunately, the retraction of the radiating element from the extended position in the retractable antenna, discussed above, causes a change in the characteristic impedance of the antenna, resulting in an unmatched impedance between the retracted antenna and the feeding transmission line. This mismatch in the impedances lowers the available power for radiation, thereby decreasing the size of the radiation pattern. The unmatched impedances also amplify the effect of noise and other interference on the desired signals making the operation of the antenna in the retracted position too unreliable.

Antenna design also attempts to achieve the best compromise between the various constraints imposed on the desired radiation pattern. Optimization of the radiation pattern may include maximizing the radiation in one direction and suppressing it in others. If a specific desired radiation pattern is difficult or impossible to obtain using a single antenna, antenna engineers will often resort to designing arrays of simple antennas. Adjustment of the amplitude and phase of the feed voltages to the various elements in the array, as well as the geometrical arrangement of these elements, often achieves the desired radiation characteristics. Unfortunately, antenna array design is complicated by the mutual interaction between the various elements in the array and the operating environment of the array. This is the case of the retractable antenna described above.

Most of the retractable antenna structures are actually two antennas in one antenna array. The antenna structure is primarily composed of a monopole antenna that slides up to an extended position and in the retracted position the antenna structure secondarily uses a coil antenna that is often disguised as a nub at the top end of the monopole antenna. In the retracted position, the antenna structure disables the monopole antenna and engages the coil antenna. So the retractable antenna structure actually uses two different antenna types integrated into one component.

Other digital devices utilize two separate antennas as part of the continuous wireless solution. This configuration contains one antenna that is retractable, which disconnects from the RF feed when retracted. The other antenna is in constant contact with the RF feed and must be considered and accounted for during any adjustment of the amplitude and phase of the feed voltages to the antenna array to achieve the desired radiation characteristics. Additionally, two antennas can be more costly and may not fit within the limited space available in the small electronic devices such as PDAs, laptop computer, PCMCIA cards, or other wireless enabled portable digital device.

SUMMARY OF THE INVENTION

The present invention has been developed in response to the current state of the art, and in particular, in response to these and other problems and needs that have not been fully or completely solved by currently available antennas for portable digital devices. Thus, it is an overall object of the present invention to provide antennas that continuously receive radio signals in both the extended and the retracted antenna positions. In addition, the present invention tunes the antenna based on the position of the antenna to achieve good impedance matching, maximizing the available power for radiation from the portable digital devices. More specifically, the present invention includes a dual position antenna incorporated into a stylus for use with a Personal Digital Assistant (PDA) that uses one radiating element tuned for optimal performance in the extended position and synthesizes a compensation impedance to match the impedance of the feeding transmission line in the retracted position.

Accordingly, one advantage of the present invention is a dual position antenna system for a digital device. The antenna system advantageously provides continuous wireless or radio frequency (RF) communication with other networks or communication systems to allow data and other information to be shared or exchanged.

Another advantage of the present invention is an antenna structure that accounts for the change in impedance between the extended and retracted antenna position, thereby improving the performance of the antenna in the retracted position.

Other advantages of the present invention include improved mechanical reliability, expanded radiation pattern in the retracted position, and relatively inexpensive replacement cost of the PDA stylus antenna versus conventional antenna structure replacement costs.

In a preferred embodiment of the present invention, the antenna is tuned based on the position of the antenna. The invention uses a single antenna electrically coupled to an impedance synthesis module that generates matched impedance at different antenna positions, such as in the extended or retracted positions. One configuration of the present invention senses the antenna position and then adapts the antenna termination circuitry to perform based on that position. The impedance of the retractable antenna changes with the electrical length of the antenna, but the dielectric constants of the antenna material remain the same. Thus, an LC circuit configuration or some other circuit configuration tunes the retracted antenna to accommodate for the change in the impedance.

In a preferred embodiment of the present invention, the dual position antenna is placed within a stylus for use with a wireless enabled PDA. The stylus antenna is easily replaceable and uses limited space on the digital device. A positional interface on the PDA is activated according to the operational position of the stylus antenna. Thus, if the stylus antenna is retracted, the transmission feed line impedance is altered to match the retracted stylus antenna impedance.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof that are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIGS. 4a–4e are cross-sectional views of various positional detection mechanisms that can be used by the stylus antenna system depicted in FIGS. 2a–2e.

DETAILED DESCRIPTION OF THE PREFERRED EMBODIMENTS

Figure 1:
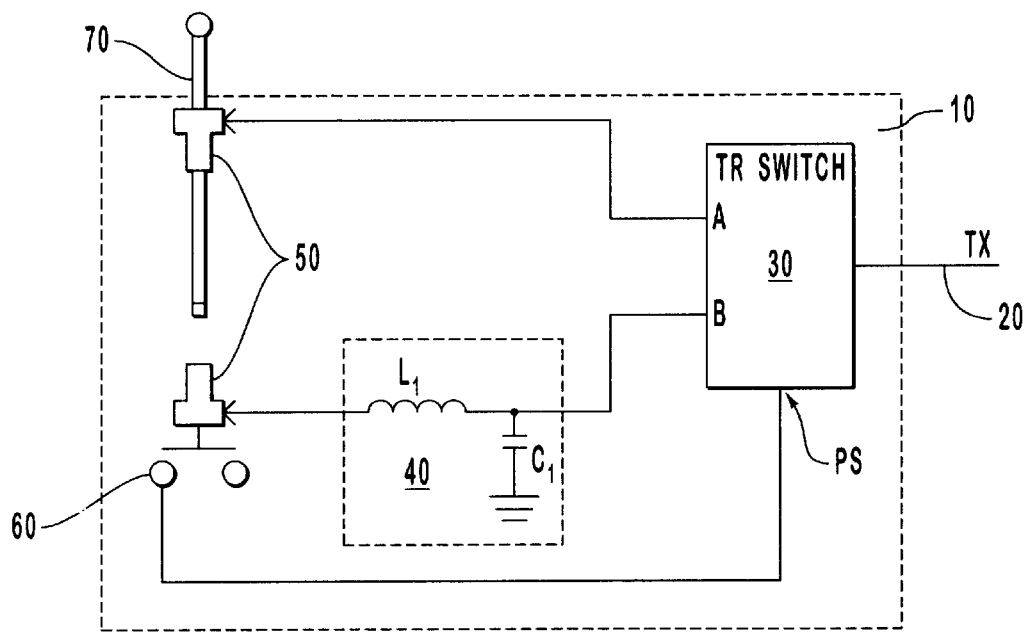
FIG. 1 is a schematic diagram of a dual position tuned transmitter feed circuit.

Antennas that connect or interface with a digital device are usually designed to match the impedance of the feeding transmission line so as to maximize the available power for radiation. Unfortunately, the retraction of the radiating element from the extended position in the retractable antenna, discussed above, causes a change in the characteristic impedance of the antenna, resulting in an unmatched impedance between the retracted antenna and the feeding transmission line. This mismatch in the impedances lowers the available power for radiation, thereby decreasing the size of the radiation pattern. The unmatched impedances also amplify the effect of noise and other interference on the desired signals making the operation of the antenna in the retracted position too unreliable. The present invention generates a compensation impedance that adjusts the termination impedance of the retracted antenna structure so as to increase the available power for radiation. The retracted position of the antenna structure of the present invention will still have a lower performance than the extended position, but wireless communication will be possible allowing the attached digital device to have continuous contact with the wireless network.

Additionally, antenna structures must often comply with standards specified by the wireless network. For example, the specifications may require that generated signals have certain frequencies and amplitudes and/or may require that the antenna structure exhibit specified termination impedance to the attached digital device. A structure that does not comply with specified requirements may not operate with the wireless network, and may have an adverse effect on the operation of the digital device by draining excess power. The design of an antenna structure or other antenna is complicated by the fact that many differences exist between the specifications of wireless networks, as such often a different antenna is required for a different wireless network. The present invention minimizes the need for a new antenna by altering the impedance characteristics of the antenna structure as seen by the digital device, thereby emulating the desired antenna.

Embodiments of the present invention overcome the challenges presented by the retracted antenna structure, or similar types of variable position antennas. Also, presently preferred embodiments can be integrated or incorporated with a stylus, thereby eliminating the necessity of having external antennas. The antenna stylus configuration lowers the cost of replacing an antenna structure in a portable digital device substantially. In addition, the antenna stylus can be easily exchanged or upgraded according to the needs of the underlying wireless radio on the digital device. Moreover, taking advantage of antenna components and systems that may already be present on a digital device minimizes the number of additional antenna components necessary for wireless communication to be continuously maintained.

Preferred embodiments of the present invention utilize systems and methods that introduce superior accuracy compared to solutions that use two physical antenna radiating elements because the impedance characteristics of the single retractable antenna is matched by systems and methods that are comparable to ideal circuit elements according to the exact position of the radiating element or the actual impedance exhibited by the antenna structure. Also, preferred embodiments of the present invention can be easily adjusted to accommodate the various positions and operating environments that may be present on different wireless networks. It will be appreciated that while the present invention is described in terms of a radio wave signal, the systems and methods of the present invention are not limited to this particular signal type, and can be applied to other electromagnetic signals used with an antenna structure.

Reference is first made to FIG. 1, which is an illustration of a dual position, tuned transmit feed module 10, an exemplary impedance matching system through which the present invention may be utilized or implemented. FIG. 1 is intended to be illustrative of potential systems that may utilize the present invention and is not to be construed as limiting. The system of FIG. 1 illustrates an antenna that can be "tuned" for both the extended and retracted positions.

The optimal tuned transmit feed module impedance required in the extended position is different than that of the retracted position. Specifically, transmission feed line 20 has a characteristic impedance that needs to be matched by tuned transmit feed module 10 in order to maximize the power available for radiation.

Transmission feed line 20 also delivers the radio signal to be transmitted by the antenna from the attached digital device. The signal is generally generated by radio components attached to or located within the digital device, but the digital device may also store prerecorded signals for repeated transmission. The radio signal is delivered to an inverted transmit receive switch (TR switch) 30, which sends the radio signal to the radiating element of antenna 70 across one of two electrical paths according to the position of antenna 70.

Normally a TR switch separates signals transmitted and received from an antenna, such that the antenna signal input is sent as two output lines to the receive and transmit portions of the radio controller. In the present invention, however; the TR switch 30 uses the antenna input line as a transmission input line from the radio and sends the transmission signal to output port A or B depending of the position of antenna 70. The position of antenna 70 can be determined using a mechanical, electrical, software, or other switch 60 to indicate a retracted or an extended position. The enabled switch 60 selects the appropriate output port on TR switch 30. Thus as antenna 70 is moved between friction blocks 50, switch 60 activates the port on TR switch 30 that receives the transmission signal.

For example, in the retracted position, switch 60 would activate port B, and the signal would be detuned according to the antenna impedance synthesis module 40, and transmitted via antenna 70. When antenna 70 is in the retracted or "down" position, impedance synthesis module 40, would detune retracted antenna 70 with a compensation impedance to better match the actual impedance associated with the retracted antenna to the impedance of transmission feed line 20. Impedance synthesis module 40 can be implemented using a LC circuit tuned to the retracted antenna position such that the LC circuit creates the compensation impedance previously discussed. The impedance synthesis module 40 may also be implemented by other impedance generation methods, such as variable resistors, potentiometers, digitally controlled current or voltage sources, electromagnetic impedance, and other impedance generators.

If however; antenna 70 was in the extended position, then the signal would be received by antenna 70 directly from port A, because in most configurations, the circuit associated with antenna 70 would be tuned for the best performance in the extended or "up" position. A tuned circuit as used above is designed to provide the necessary matching impedance for the extended antenna 70 relative to the transmission feed line 20.

FIG. 1 illustrates one embodiment of the present invention being used as a dual state antenna structure in which the impedance matching circuit 40 introduces one of two difference impedances into the antenna circuit, depending on which of the two positions antenna 70 is in. The addition of a compensation impedance by the present invention, enables antenna 70 to function in both the extended and retracted positions. Although connectivity of the antenna structure in the retracted position can be maintained over a more limited range when compared to the range of the extended position, the limited retracted range still allows small electronic devices to be stowed away and maintain connections to an outside device or wireless network. This ability also minimizes the chance of the antenna getting broken, as the user will be more likely to retract the antenna knowing that they will not lose information.

In an alternative configuration, tuned transmit feed module 10 assumes that if the antenna is not retracted, then some portion will be extended so that the extended path associated with port A on TR switch 30 should be used. This modification is useful for situations where antenna 70 is positioned between the retracted and extended positions.

Another configuration of the present invention uses the retracted path associated with port B of TR switch 30 for any antenna position less than fully extended. This configuration varies the compensation impedance relative to the position of the radiating element of antenna 70. One method of varying the compensation impedance relative to the position of the radiating element is to attach a variable switch, such as a potentiometer, to the radiating element. The potentiometer would be tuned to exhibit the appropriate impedance based on the position of antenna 70.

Figure 2A:
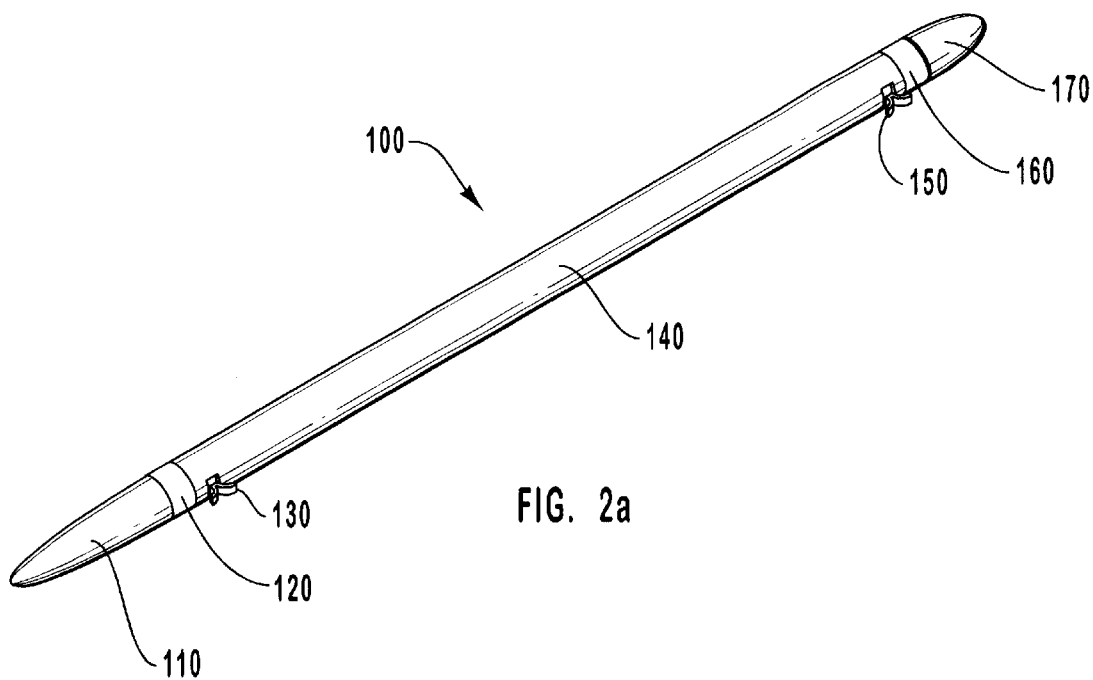
FIG. 2a is a perspective view of a stylus antenna system for use with a PDA.
Figure 2B:
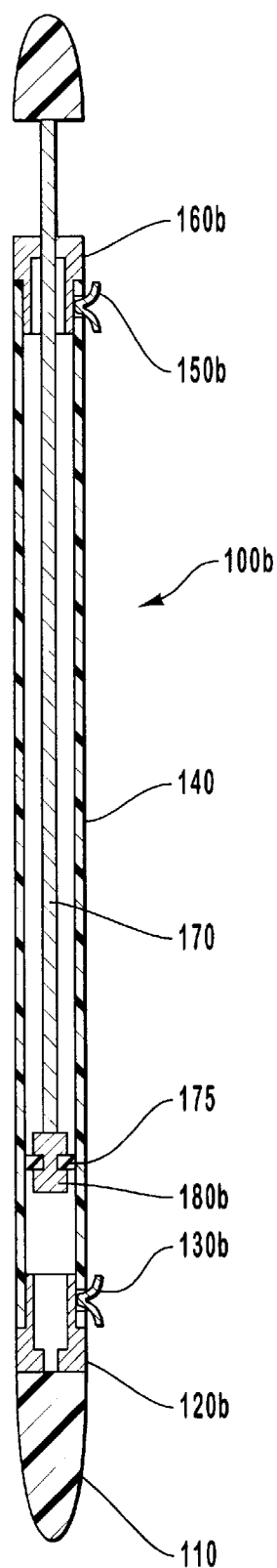
FIG. 2b is a cross-sectional view of the stylus antenna system in FIG. 2a with the radiating element partially extended.
Figure 2C:
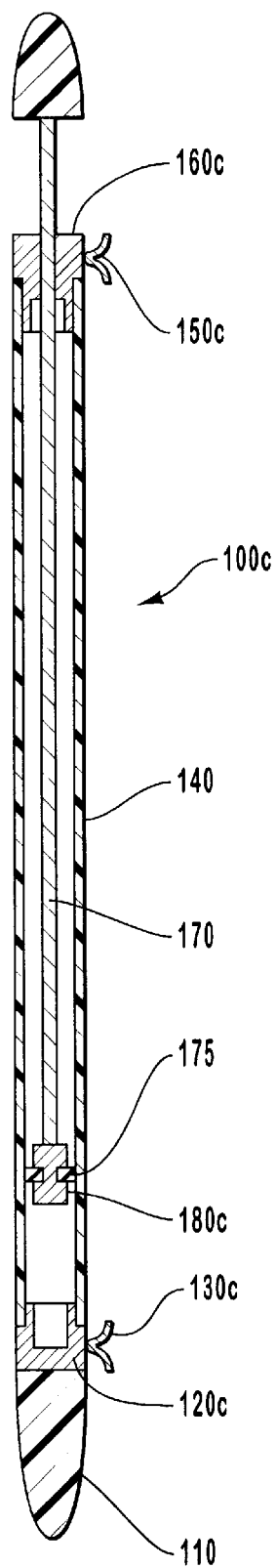
FIG. 2c is a cross-sectional view of an alternative configuration of the stylus antenna system without a connection clip slot.
Figure 2D:
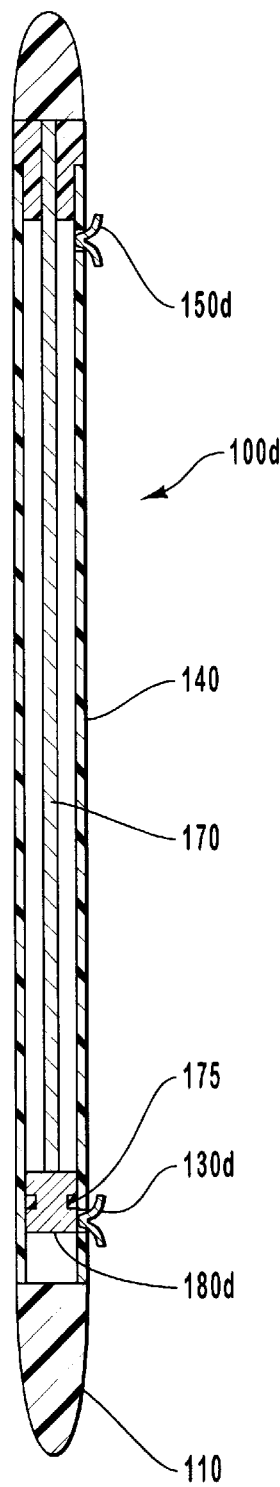
FIG. 2d is a cross-sectional view of an alternative configuration of the stylus antenna system without a metal sleeve.
Figure 2E:
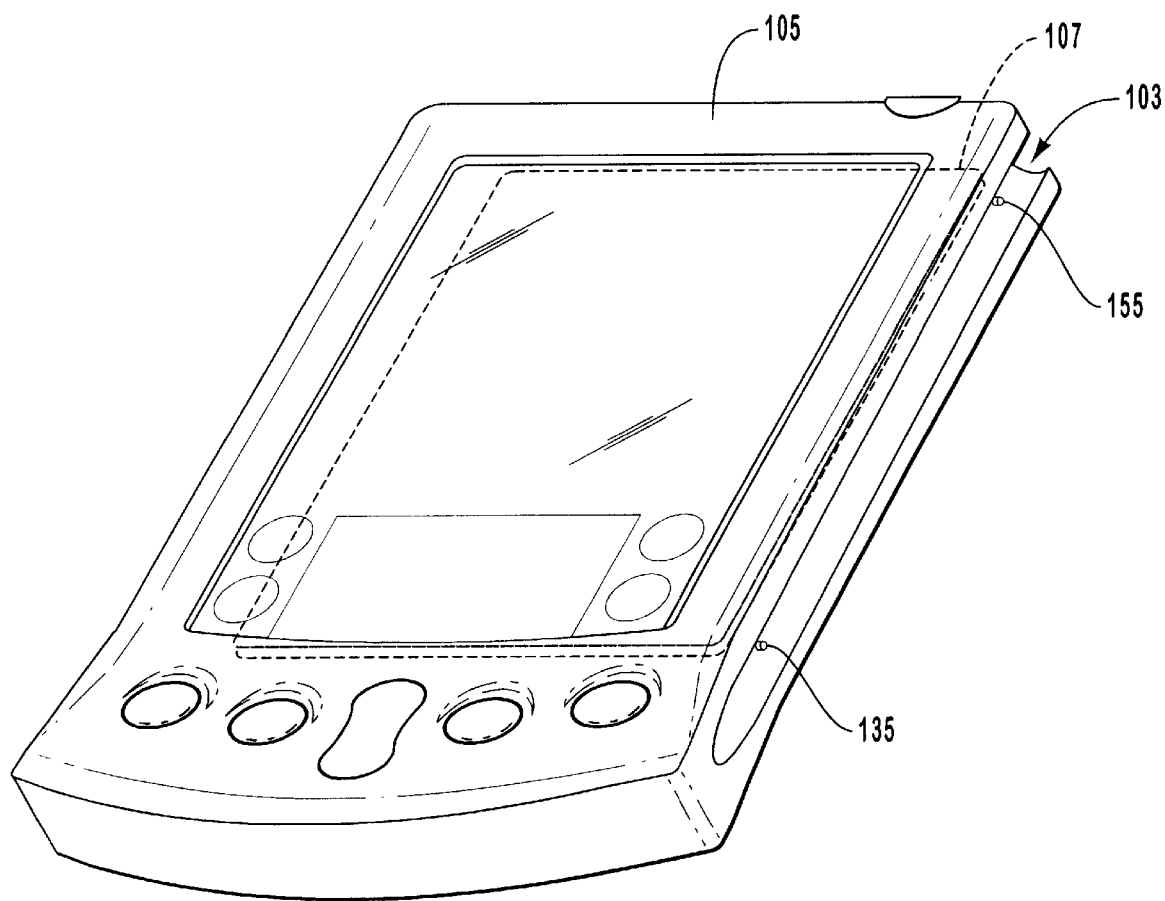
FIG. 2e is a perspective view of a an exemplary PDA that provides a suitable operating environment for the stylus antenna system.

With reference now made to FIG. 2a, which is a perspective view of a stylus antenna for use with a Personal Digital Assistant (PDA) device, which is illustrated in the perspective view of FIG. 2e. PDA devices, like the 3Com PalmPilot®, provide a user with an easy, compact device that can hold all of a user's daily organizational essentials in one place. A PDA device also provides a user with quick and easy access to multiple applications customized to meet the individual user's needs. A successful PDA device is lightweight enough to carry everywhere and small enough to fit into a pocket, as a user won't use the PDA device if they don't carry it. Other desirable features found on a PDA device include instant information access, intuitive construction for easy use, conservative energy cell consumption, extensive personal calendaring features, a customized address book, a digital memo pad, an expense calculator, desktop E-mail connectivity, Internet compatibility, and local or remote database synchronization.

While the development of PDA devices has dramatically reduced digital complexity for the user, PDA devices have not been able to continuously receive wireless signals regardless of antenna position, thereby enabling automatic connection and synchronization of PDA databases for the user. There are great advantages to implementing a continuous wireless standard between devices such as a PC and a PDA. Such advantages include enabling real time updates, user notification, authentication and authorization, and file synchronization. Stylus antenna 100 comprises molded tip 110, lower metal sleeve 120, lower connection clip 130, stylus housing 140, upper connection clip 150, upper metal sleeve 160, and radiating element 170.

The molded tip 110 enables data entry to a touch sensitive screen on the PDA. Lower metal sleeve 120 and upper metal sleeve 160 provide a conductive surface to connect with the radiating element 170 of the stylus antenna 100. The lower connection clip 130 and the upper connection clip 150 mechanically and electrically couple to lower conductive clip 135 and upper conductive clip 155 of PDA 105.

With reference made now to FIG. 2b, which is cross-sectional view of stylus antenna 100 illustrated in FIG. 2a. Radiating element 170 further comprises an antenna connection collet (ACC) 180 and nylon sleeve 175. ACC 180b electrically and mechanically couples to lower metal sleeve 120b when the antenna is in the retracted position and upper metal sleeve 160b in the extended position. Nylon sleeve 175 stabilizes radiator element 170 as it moves from a retracted to an extended positional state in the cylinder created by stylus housing 140. Nylon sleeve 175 also controls the penetration of ACC 180b into lower metal sleeve 120b and upper metal sleeve 160b.

Stylus antenna 100 has two operational positions; retracted via lower connection clip 130b and extended via the upper connection clip 150b. The connection clips access the metal sleeves through stylus housing 140. In the retracted position, the antenna signal is received through radiator element 170 and transferred to lower connection clip 130b via ACC 180b and lower metal sleeve 120b. Signals are transmitted in the retracted position from PDA 105 via lower connection clip 130b, lower metal sleeve 120b, and ACC 180b. The impedance synthesis for the retracted position can be generated on PDA 105 or the compensation impedance maybe introduced within the stylus antenna 100.

FIG. 2c is a cross-sectional view of an alternative configuration for stylus antenna 100c. Upper and lower connection clips 150c and 130c are directly coupled to upper and lower metal sleeves 160c and 120c respectively. This configuration allows a single molded piece to be used for the stylus housing 140 and the molded tip 110. In a related configuration the connection clips are completely removed from stylus antenna 100c and the PDA access the radiator element 170 directly via the metal sleeves. In this configuration the stylus slot 103 must mechanically restrain the stylus without the mechanical assistance of the connection clips used in the previously described configurations. Another configuration places a lower metal sleeve in contact with ACC 180c along the interior of the stylus housing from the retracted position until just short of the extended position. This allows the partially retracted stylus antenna to continue transceiving radio signals, regardless of the positional requirements of the radiator element.

FIG. 2d is a cross-sectional view illustrating another configuration of the stylus antenna 100d that does not use a metal sleeve. In this configuration the PDA is able to determine the stylus antenna 100d position based on direct contact of either upper connection clip 150d or lower connection clip 130d with ACC 180d. In this configuration, ACC 180 must be larger so as to electrically couple at the connection points with the connection clips.

FIG. 2e is a perspective view of an exemplary wireless enabled PDA. PDA 105 comprises a stylus slot 103, lower conductive clip 135, upper conductive clip 155, printed circuit board (PCB) 107, a touch sensitive display screen, user interface control buttons, and other components to enable wireless communication. Lower conductive clip 135 and upper conductive clip 155 are electrically connected to PCB 107 of PDA 105. If the stylus antenna is in the retracted position impedance synthesis modules located on PCB 107 supply the necessary compensation impedance to properly terminate the stylus antenna 100. Previous wireless enabled PDA devices had antenna structures that were very difficult to replace if bent or broken. The stylus antenna 100 depicted in FIG. 2a may be selectively inserted into the stylus slot 103 of the PDA 105 depicted in FIG. 2e. This flexibility allows different stylus antenna types to be substituted into the stylus slot 103, such as short-range and long-range wireless antennas. In one configuration, each stylus antenna is individually optimized according to the type of wireless protocol being used by the PDA. While long-range wireless standards may be available and defined, the near proximity use of near and even co-located devices wants for the development of a short-range wireless standard.

One such short-range wireless standard that is in the process of being embraced is preliminarily known by the name of "Bluetooth." Bluetooth, which is only one example of a short-range wireless standard, is actually a combination of specialized computer chips and software. Bluetooth is the codename for a technology specification for small form factor, low-cost, short-range radio links between mobile PDAs, PCs, mobile phones and other portable devices. Bluetooth, for example, also offers speedy transmission of up to one megabyte per second, over 17 times as fast as a typical modem. One of the present Bluetooth specification restrictions is to limit the transmission range so that the resulting radiation pattern typically does not exceed 10 meters.

Additional short-range wireless standards include the IEEE 802.11 RF wireless standards: 802.11 HR, 802.11b, and 802.11@5 GHz standards. Other exemplary short-range wireless standards potentially useful with the present invention include: HiperLan, HiperLan II, HomeRF, SWAP, OpenAir, and other wireless protocols.

These wireless standards enable users to connect a wide range of computing and telecommunications devices easily and simply, without the need to buy, carry, or connect cables. They deliver opportunities for rapid ad hoc connections, and the possibility of automatic, unconscious, connections between devices. They may virtually eliminate the need to purchase additional or proprietary cabling to connect individual devices. Because these standards can be used for a variety of purposes, they will also potentially replace multiple cable connections via a single radio link.

FIGS. 3a–3d illustrate various stylus antenna positional sensor switches. In order to sense which operational state the antenna is in, a switch or sensing mechanism can be built into the stylus antenna depicted in FIG. 2a so that the transmission circuit on the connected PDA can apply the correct impedance to the antenna structure. Several different methods are available.

Figure 3A:
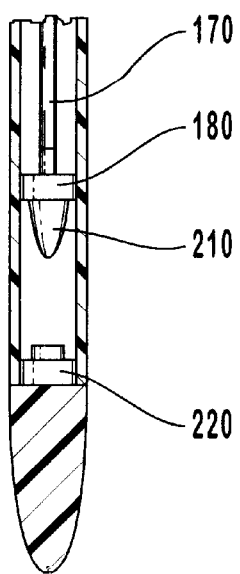
FIGS. 3a–3d are cross-sectional views of various stylus antenna positional sensor switches that can be used with the exemplary system illustrated previously in FIGS. 2a–2e.

For example, FIG. 3a is a cross-sectional view illustrating a stylus antenna pressure sensor switch. Radiator element 170 is electrically and mechanically fastened to a sliding contact or ACC 180. A non-conductive actuator 210 is located opposite the radiator element 170 on ACC 180. The actuator 210 depresses pressure switch 220 when the antenna is in the retracted position and releases pressure switch 220 upon extension.

Figure 3B:
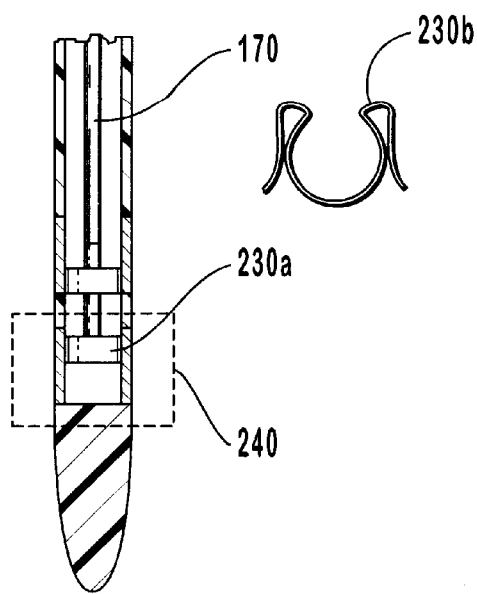

FIG. 3b is a cross-sectional view illustrating a stylus antenna with a conductive switch. This configuration applies a conductive disk 230a or a conductive clip 230b to the bottom of the radiator element 170. Disk 230a or clip 230b connect both sides of the polarized contacts when the antenna is retracted or extended. The connection may be electrical, magnetic, or other reliable connection that upon passing through switch area 240 can activate the necessary impedance circuitry.

Figure 3C:
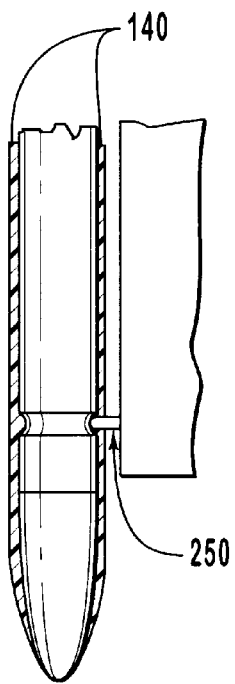
Figure 3D:
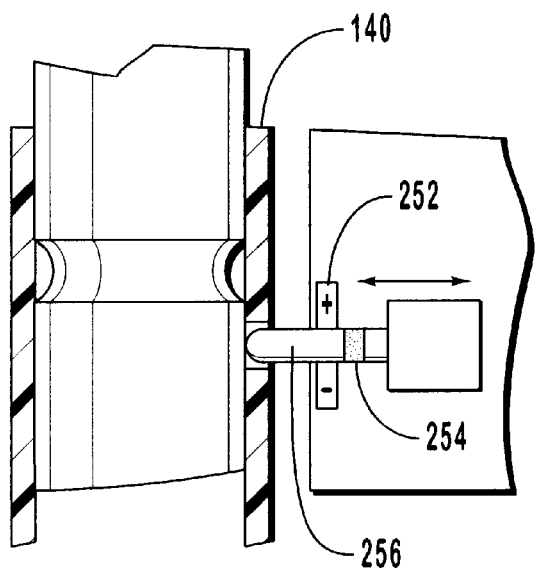

FIGS. 3c and 3d illustrate a sliding contact using a détente motion to activate a switch. FIG. 3c depicts détente switch 250 with contact slots created in the stylus housing 140. The contact slots hold insulating guide pin 256 in place along the radiator element of the antenna until a designated position allows the insulating guide pin 256 to move forward, such as a retracted or extended position. FIG. 3d provides a cross-sectional view of détente switch 250 just prior to activation. In a retracted or extended position, guide pin 256 allows conductive section 254 of the pin to close détente switch contacts 252. Détente switch contacts 252 are connected to PCB 107 of a digital device to indicate the necessary compensation impedance, which the transmission circuit should generate.

FIG. 4 illustrates a multiple position impedance matching antenna as is previously discussed. A preferred embodiment of the stylus antenna contains impedance matching circuitry for the antenna regardless of the position of the radiator element, whereas the previously described embodiments focus on determining whether the antenna is in a retracted or extended position. In this configuration the antenna is constructed so that the exact position of the radiator element is known. Thereby allowing the antenna to change its compensation impedance when in different positions to create a proper termination impedance to maximize the available power for radiation. The necessary compensation impedance may be predicted according to the "balanced nature" changes to the antenna impedance as the antenna is extended or retracted. There are a myriad of ways that this might be accomplished, and five are illustrated in FISG. 4a, 4b, 4c, and 4e.

In FIG. 4a, impedance matching antenna 300 comprises radiator element 310, a position detection module, a impedance synthesis module, grounding cable 340, and external shielding 350. Exemplary position detection modules include a fixed collar, a potentiometer, a variable impedance circuit, a magnetic sensor array, an optical sensor array, or other device for measuring the extension of the radiating element. Exemplary impedance synthesis modules include a variable LC circuit, a potentiometer, an electronically controlled current source, or other device for generating the appropriate compensation impedance to properly terminate the radiating element with the transmission feed line. One embodiment, using the fixed collar and the variable impedance circuit, generates a compensation impedance that combines with the impedance of the radiating element to match the characteristic or termination impedance of the transmission feed line. In this embodiment, as radiator element 310 is extended, the fixed collar moves with radiator element 310 and thereby lowers the necessary compensation impedance. The magnitude and form of compensation impedance required varies according to the antenna type being used.

In FIG. 4b, radiator element 310 slides through collar 330b. Collar 330b slides along variable resistor 320b. Variable resistor 320b introducing an appropriate compensation impedance to radiator element 310.

In FIG. 4c, a cross-sectional view illustrates an impedance matching antenna that utilizes a potentiometer. The extendable portion of the antenna, radiator element 310 is attached to collar 330c. Collar 330c has an activator that selectively attached to potentiometer 320c according to the antenna positional changes. Potentiometer 320c reflects the positional change and increases or decreases the compensation impedance accordingly. Thus, potentiometer 320c remains stationary while collar 330c moves with radiator element 310.

In FIG. 4d, a cross-sectional view illustrates an impedance matching antenna that uses magnetic sensors. Magnet collar 330d is attached to radiator element 310, so that the magnet 330d moves when the antenna is extended or retracted. Magnetic sensors 320d are placed next to the magnet to sense the exact antenna position. With the positional information an external impedance synthesis circuit will match the termination impedance according to the antenna position for maximum power transfer.

FIG. 4e illustrates impedance matching using a fixed LED sensor array 320c. Light blocker 330e covers individual LEDs in LED sensor array 320e as radiator element 310 extends and retracts. As radiator element 310 extends and retracts, the light blocker 330e blocks the light, telling the impedance synthesis circuit the exact antenna position so that the circuit can appropriately generate a compensation impedance to match the termination impedance.

Other non-illustrated versions of generating a compensation impedance to match the characteristic impedance of the transmission feed line include attaching the antenna structure transmission line to an impedance synthesis circuit consisting of an analog to digital converter, a simplified DSP or a micro-controller, a digital to analogy converter, and a voltage controlled current source. The converter could convert the received signals to digital values that are interpreted by the DSP. The DSP would then synthesize that necessary impedance based on the detected signals from the antenna. These calculations would include determining the necessary current to be added to the circuit to generate the proper termination impedance. Upon concluding the calculations the DSP would send a digital value to the digital to analogy converter representing the voltage necessary to generate the compensation impedance. The voltage controlled current source generates impedance according to the calculated values. It is essential that the impedance synthesis circuit described in this configuration supply the current based impedance close to the transmission feed line, otherwise the latency would disturb the actual signals being sent and received.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. A stylus antenna structure connected to a transmission feed line on a digital device, the stylus antenna structure comprising:
    a radiator element for receiving and transmitting electromagnetic energy, the radiator element having an extended and a retracted position;
    a termination module located within the digital device electrically connected to the radiator element and the transmission feed line, the termination module synthesizing a termination impedance for optimal power transfer between the transmission feed line and the radiator element; and
    a stylus comprising a molded tip and a non-conductive cylinder with an upper and lower end, the molded tip used predominately for data entry on a touch sensitive screen on the digital device and the non-conductive cylinder protecting the radiator element located substantially within the non-conductive cylinder in the retracted position, the stylus being formed to selectively mechanically couple with the digital device via the insertion into a stylus socket on the digital device such that the stylus socket aligns the stylus to electrically couple the radiator element to the termination module.

2. The stylus antenna structure as recited in claim 1, wherein a first stylus antenna comprises the radiator element and the stylus, the first stylus antenna can be replaced with a second stylus antenna, wherein the first stylus antenna is tuned for use with a first wireless protocol and the second stylus antenna is tuned for use with a second wireless protocol.

3. The stylus antenna structure as recited in claim 1, wherein the retracted position is any position less than the extended position.

4. The stylus antenna structure as recited in claim 3, wherein the termination module only synthesizes the termination impedance for optimal power transfer between the transmission feed line and the radiator element in the retracted position.

5. The stylus antenna structure as recited in claim 1, wherein the stylus antenna structure further comprises:
    an upper metal sleeve attached to the upper end of the non-conductive cylinder, the upper metal sleeve being electrically connected to the radiator element in the extended position and selectively electrically coupled to the digital device when the stylus is mechanically coupled to the digital device; and
    a lower metal sleeve attached to the lower end of the non-conductive cylinder, the lower metal sleeve being electrically connected to the termination module, the radiator element in the retracted position, and selectively electrically coupled to the digital device when the stylus is mechanically coupled to the digital device.

6. The stylus antenna structure as recited in claim 1, wherein the stylus antenna structure further comprises:
    a lower connection clip in electrical communication with the radiator element in the retracted position, the lower connection clip being selectively electrically coupled to a lower conductive clip on the digital device; and
    an upper connection clip in electrical communication with the radiator element in the extended position, the upper connection clip being selectively electrically coupled to a upper conductive clip on the digital device.

7. A stylus antenna for use with a wireless enabled digital device, the digital device having an antenna interface with a characteristic impedance, the stylus antenna comprising:
    a stylus facilitating data entry to the digital device, the stylus selectively coupling with a stylus socket on the digital device that electrically aligns the antenna interface with the stylus;
    a radiator element to transmit and receive electromagnetic energy in the form of radio waves with the antenna interface, the radiator element having an extended position with an extended impedance tuned for the antenna interface to maximize the available power for radiation and a retracted position with a retracted impedance, the radiator element being operably attached to the stylus; and
    an impedance synthesis module that generates a compensation impedance to be electrically combined with the retracted impedance of the radiator element in the retracted position creating an impedance combination that matches the characteristic impedance of the antenna interface so as to maximize the available power for radiation when the radiator element is in the retracted position.

8. The stylus antenna as recited in claim 7, wherein the radiator element is frequency independent to provide equal transceiving performance over a broad frequency band.

9. The stylus antenna as recited in claim 7, wherein the retracted position is any radiator element position less than the extended position and the retracted impedance varies according to the retracted position.

10. The stylus antenna as recited in claim 9, further comprising a position detection module connected to the stylus and radiator element, the position detection module for determining an actual position of the radiator element and transmitting the actual position to the impedance synthesis module.

11. The stylus antenna as recited in claim 10, wherein the impedance synthesis module further comprises a processor and a voltage controlled variable LC circuit impedance source, the processor receiving the actual position, calculating the compensation impedance, and sending a corresponding voltage to the impedance source for generating the compensation impedance.

12. The stylus antenna as recited in claim 10, wherein the impedance synthesis module and the position detection module comprises a potentiometer tuned to generate the compensation impedance based on the received actual position of the radiator element.

13. The stylus antenna as recited in claim 10, wherein the position detection module comprises:
    a magnet on the radiating element that moves when the radiating element is extended or retracted; and
    magnetic sensors positioned next to the radiating element to detect the position of the magnet.

14. The stylus antenna as recited in claim 10, wherein the position detection module comprises:
- an optical sensor array configured to emit optical signals at positional increments less than the extended position; and
- an optical inhibitor attached to the radiating element so that when the radiating element is moved the inhibitor blocks the optical signal next to the position of the optical inhibitor.

15. The antenna as recited in claim 9, wherein the position detection module further comprises a collar affixed to the radiator element; and the impedance synthesis module further comprises a variable resistor mechanically attached to the collar and electrically attached to the radiating element, the variable resistor generating the compensation impedance based on the position of the collar.

16. A method for matching the impedance of a stylus antenna to the feeding transmission line so as to maximize the available power for radiation when the stylus antenna is in different positions between and including an extended and a retracted position, the method comprising the steps of:
- determining the characteristic impedance of the feeding transmission line;
- detecting the position of the extendable portion of the stylus antenna;
- calculating the stylus antenna impedance based in part on the position of the extendible portion of the stylus antenna and based in part on a unit impedance of the stylus antenna; and
- generating a compensation impedance such that the combination of the stylus antenna impedance and the compensation impedance creates a matched impedance to the feeding transmission line.

17. The method for matching impedance as recited in claim 16, wherein the step of detecting the position uses a collar fixed to the extendable portion of the antenna.

18. The method for matching impedance as recited in claim 17, wherein the collar fixed to the extendable portion of the antenna is attached to a potentiometer that generates the matched impedance based on the position of the collar in the extendable portion.

19. The method for matching impedance as recited in claim 17, wherein the collar fixed to the extendable portion of the antenna is attached to a variable resistor calibrated to generate the matching impedance of the transmission line when the variable resistor is used in combination with the antenna.

20. The method for matching impedance as recited in claim 17, wherein the collar fixed to the extendable portion of the antenna is a magnet, so that the magnet moves when the antenna is extended or retracted and the position is detected by magnetic sensors placed next to the extendable portion.

21. The method for matching impedance as recited in claim 16, wherein the extendable portion is a radiating element having a balanced impedance characteristic.

22. The method for matching impedance as recited in claim 16, wherein the unit impedance is based in part on the dielectric constants of material used in the extendable portion of the stylus antenna.

* * * * *

UNITED STATES PATENT AND TRADEMARK OFFICE
CERTIFICATE OF CORRECTION

PATENT NO. : 6,262,684 B1
DATED : July 17, 2001
INVENTOR(S) : Kurt Stewart, Sy Prestwich, Jeffrey L. Jones and Steven Lo Forte It is certified that error appears in the above-identified patent and that said Letters Patent is hereby corrected as shown below:

Column 4,
Line 4, after "these" change "drawing" to -- drawings --
Line 24, after "view of" delete "a"

Column 9,
Line 63, after "illustrated in" change "FISG." to -- FIGS. --
Line 64, before "and 4e" insert -- 4d, --

Column 10,
Line 44, after "sensor array" change "320c" to -- 320e --
Line 56, after "digital to" change "analogy" to -- analog --
Line 64, after "digital to" change "analogy" to -- analog --

Signed and Sealed this

Eleventh Day of June, 2002

Attest:

Attesting Officer

JAMES E. ROGAN
Director of the United States Patent and Trademark Office